United States Patent [19]

Hayakawa et al.

[11] Patent Number: 5,310,785
[45] Date of Patent: May 10, 1994

[54] COATING COMPOSITION AND METHOD OF COATING GRANULAR FERTILIZER WITH SAME

[75] Inventors: Masanori Hayakawa; Michio Miyazawa; Yoshisada Hayase, all of Yamaguchi; Hiroshi Hotta; Osamu Kondo, both of Hyogo, all of Japan

[73] Assignees: Central Glass Company, Limited; Shinto Paint Co., Ltd., Amagasaki, Japan

[21] Appl. No.: 902,728

[22] Filed: Jun. 23, 1992

[30] Foreign Application Priority Data

Jun. 26, 1991 [JP] Japan .................. 3-154730

[51] Int. Cl.$^5$ .................. C08G 63/49; C05G 3/00
[52] U.S. Cl. .................. 525/7; 524/310; 524/313; 71/64.07
[58] Field of Search .................. 525/7; 524/310, 313; 71/64.07

[56] References Cited

U.S. PATENT DOCUMENTS 3,223,518  12/1965  Hansen .................. 71/64

FOREIGN PATENT DOCUMENTS 0067794  6/1978  Japan .
3095189  4/1988  Japan .
1108188  4/1989  Japan .
1101551  1/1968  United Kingdom .

Primary Examiner—James J. Seidleck
Assistant Examiner—I. Zemel
Attorney, Agent, or Firm—Keck, Mahin & Cate

[57] ABSTRACT

The disclosure relates to a coating composition for forming a coating film on a granular fertilizer in order to delay the release of plant nutrient elements therefrom. The coating composition includes an oil-modified alkyd resin and an unsaturated oil containing a conjugated double bond. The granular fertilizer can be coated with the coating composition without using an organic solvent.

7 Claims, No Drawings

COATING COMPOSITION AND METHOD OF COATING GRANULAR FERTILIZER WITH SAME

BACKGROUND OF THE INVENTION

1. Field of the Invention

The present invention relates in general to a coating composition for forming a coating film on a granular fertilizer in order to delay the release of plant nutrient elements therefrom and a method of coating a granular fertilizer with such a coating film.

2. Description of the Prior Art

Inorganic synthetic fertilizers are generally water-soluble, and thus readily available to plants. Thus, it is difficult to maintain the effect of the fertilizers for a relatively long period due to the loss of nutrients of the fertilizers through leaching, soil erosion, denitrification or the like. Furthermore, due to too ready availability of the fertilizers, crops tend to be damaged when a soil solution containing a relatively large amount of dissolved nutrients is brought into contact with the crop roots. Therefore, slow-release fertilizers have been proposed to slow down the rate of release of nutrients from the fertilizers. For this purpose, for example, it has been proposed to coat granular fertilizers with organic or inorganic films. Majority of the films are organic ones which are made of resin or the like. An organic solvent is generally used in the process to coat a granular fertilizer with an organic film. However, the use of organic solvents is not desirable from the environmental point of view because they are toxic and inflammable.

There is a proposed method of producing a granular fertilizer coated with a resin film without using an organic solvent. In this method, granules of the fertilizer are coated with an aqueous dispersion of a resin, and then the coated granules are dried to form the resin film on the granular fertilizer. However, the resin film on the granular fertilizer has the following drawbacks.

It is inferior in strength and gas permeability. Blocking, i.e. undesirable adhesion of the resin film, tends to occur. Furthermore, it is necessary to spend relatively much time and energy to dry the aqueous resin film because latent heat of vaporization of water is relatively large.

SUMMARY OF THE INVENTION

It is therefore an object of the present invention to provide a coating composition which is free from the above-mentioned drawbacks, and a method of coating a granular fertilizer with the coating film without using an organic solvent.

According to a first aspect of the present invention, there is provided a coating composition for coating a granular fertilizer therewith, the coating composition including: an oil-modified alkyd resin; and an unsaturated oil containing a conjugated double bond.

According to a second aspect of the present invention, there is provided a method of forming a coating film on a granular fertilizer, the method including the steps of: (i) mixing an oil-modified alkyd resin with an unsaturated oil containing a conjugated double bond so as to form a mixture; (ii) heating the granular fertilizer; and (iii) applying the mixture to the heated granular fertilizer so as to form the coating film on the granular fertilizer.

According to a third aspect of the present invention, there is provided a film coated on a granular fertilizer, the film including a product prepared by process comprising the steps of: (i) mixing an oil-modified alkyd resin with an unsaturated oil containing a conjugated double bond so as to form a mixture; (ii) heating the granular fertilizer; (iii) and applying the mixture to the heated granular fertilizer so as to form the coating film on the granular fertilizer.

DESCRIPTION OF THE PREFERRED EMBODIMENTS

According to the present invention, there is provided a coating composition for forming a coating film on a granular fertilizer in order to delay the release of plant nutrient elements therefrom. The coating composition is prepared, in the presence of a metallic soap, by mixing an oil-modified alkyd resin with an unsaturated oil containing a conjugated double bond.

It is usual that an oil-modified alkyd resin is prepared by heating the mixture of a polybasic acid such as phthalic anhydride or maleic anhydride, a polyhydric alcohol such as pentaerythritol or glycerol, and a modifying agent such as a natural vegetable fat or oil or a natural animal fat so as to induce condensation. As the natural vegetable oil or fat, it is usual to use soybean oil, linseed oil, tung oil, safflower oil, coconut oil, palm oil or the like. As the natural animal fat, it is usual to use beef tallow or the like.

The oil-modified alkyd resin according to the present invention is not limited to a specific type. However, it is preferable to use an oil-modified alkyd resin of which molecular weight is in the range from 500 to 5000. If the molecular weight is less than 500, curing or drying time of the coating composition becomes too long and the coating film becomes insufficient in strength. If the molecular weight is more than 5000, the coating composition becomes too thick in viscosity to efficiently coating the granular fertilizer therewith.

As the unsaturated oil containing a conjugated double bond, i.e. an oil containing an unsaturated fatty acid having a conjugated double bond, it is usual to use tung oil, dehydrated caster oil or the like. Tung oil contains, as a main constituent, eleostearic acid having a conjugated double bond. Dehydrated caster oil contains, as a main constituent, 9,11-linoleic acid having a conjugated double bond. In the present invention, it is optional to use an unsaturated oil containing a conjugated double bond, or an unsaturated fatty acid having a conjugated double bond, which is purified from the unsaturated oil. The unsaturated oil serves to dilute the alkyd resin so as to reduce its viscosity. In the presence of the metallic soap, crosslinking of the unsaturated oil itself and/or crosslinking between the unsaturated oil and the alkyd resin are formed by heating and/or contact with air, such that resinification of the coating composition proceeds.

It is preferable that the mixing ratio, by weight, of the oil-modified alkyd resin to the unsaturated oil falls within the range from 2:8 to 7:3. If the ratio of the oil-modified alkyd resin is less than 2, the coating film on the granular fertilizer becomes insufficient in strength and water resisting property. If the ratio of the oil-modified alkyd resin is more than 7, the coating composition becomes too thick in viscosity to efficiently coat the granular fertilizer therewith.

As the metallic soap, it is usual to use a naphthenate of Mn, Co, Zr, Ni, Fe or Pb, and/or an octylate of Mn, Co, Zr, Ni, Fe or Pb. It is preferable to use the metallic soap in the amount ranging from 0.5 to 3 wt % of the total amount of the oil-modified alkyd resin and the unsaturated oil. If the amount of the metallic soap is less than 0.5 wt %, the reaction (crosslinking) rate becomes too slow. If the metallic soap in the amount more than 3 wt % is added, the effect of metallic soap is not enhanced any more with increasing the amount of the metallic soap.

It is optional to add a so-called antiskinning agent to the coating composition to prevent skinning, i.e. the formation of gel film on the surface thereof, during transportation or storage thereof. As the antiskinning agent, it is usual to use dipentene, methoxyphenol, cyclohexanone oxime, methyl ethyl ketoxime or the like. It is optional to combine two or more of these substances. However, it is not necessary to add the antiskinning agent if the contact of the coating composition with air can be cut off by, for example, nitrogen seal.

As the granular fertilizer, it is not limited to a specific type, and thus it is usual to use a granular straight fertilizer such as ammonium chloride, ammonium sulfate, urea or potassium chloride, a granular compound fertilizer containing two or more of N, P and K, or a granular organic fertilizer.

According to the present invention, the granular fertilizer is heated up to a predetermined temperature, namely a so-called coating temperature, while the granular fertilizer is kept fluidized or agitated. Then, the coating composition is applied to the granular fertilizer by spraying, dripping or the like, while the granular fertilizer is kept fluidized or agitated, so as to uniformly form the coating film on the granular fertilizer. The coating film on the granular fertilizer is cured or dried by heating and contact with air.

The granular fertilizer is fluidized by a fluidization device, or agitated by a rolling pan, a rolling drum or the like.

It is usual to adjust the coating temperature of the granular fertilizer so as to fall within the range from 30° to 150° C. However, if the granular fertilizer has granules which tend to be decomposed or deteriorated by heating, the coating temperature must be lowered. For example, urea is preferably heated at a temperature not higher than 90° C.

The coating is preferably conducted by spraying of the coating composition with using a two-fluid nozzle. The coating composition is atomized in air by the nozzle. However, it is optional to use other methods of applying the coating composition to the granular fertilizer, such as dripping or the like, as long as the granular fertilizer is uniformly coated with the coating composition.

The coating composition has a relatively high viscosity, and thus it is preferable to heat the coating composition up to a certain temperature so as to lower its viscosity. This facilitates the spraying.

EXAMPLE 1

According to the following process, a coating composition was sprayed to urea granules while the granules were kept heated and fluidized.

The coating composition was prepared by mixing constituents which are shown in Table 1, and heated up to and maintained at a temperature of 40° C. 800 g of urea granules (average diameter: 3.3 mm) was put in a cylindrical fluidization vessel having a diameter of 10 cm. Then, the granules were fluidized and heated by continuous upward flow of hot air. Thus, the temperature of the granules was heated up to and maintained at 70° C. Then, the coating composition maintained at 40° C. was sprayed to the fluidized granules at a constant rate of 1 g/min with using a pump and a two-fluid nozzle. After the spraying, the fluidization of the granules was continued for 20 min so as to cure the coating composition on the granules.

The amount of the coated film by wt % relative to that of the coated granules was measured. The result is shown in Table 2.

A test was conducted on the coated urea granules so as to evaluate the rate of nitrogen release therefrom. In this test, the coated urea granules were put in water of 25° C. The result is shown in Table 2. This test was conducted according to the following process.

First, 12.5 g of the coated urea granules was placed in a 300-ml Erlenmeyer flask on a precision balance. Then, 250 ml of deionized water was added to the flask. Then, the flask was left in a thermostat and maintained at 25° C. After an elapse of a certain period, the solution in the flask was separated from the urea granules. Then, the released nitrogen in the solution in the forms of ammonium and urea was determined by a so-called formol method and a so-called p-dimethylaminobenzaldehyde method, respectively.

EXAMPLE 2

A coating composition was prepared by mixing constituents which are shown in Table 1. Then, with using this coating composition, the process of Example 1 was repeated. The test of Example 1 was repeated, and the result is shown in Table 2.

EXAMPLE 3

A coating composition was prepared by mixing constituents which are shown in Table 1. Then, with using this coating composition, the process of Example 1 was repeated, except that the temperature of the urea granules was maintained at 90° C. with using hot air. The test of Example 1 was repeated, and the result is shown in Table 2.

EXAMPLE 4

A coating composition was prepared by mixing constituents which are shown in Table 1. Then, with using this coating composition, the process of Example 1 was repeated. The test of Example was repeated, and the result is shown in Table 2.

EXAMPLE 5

The coating composition of Example 1 was used. The process of Example 1 was repeated, except that granules (average diameter: 3.1 mm) of a so-called NK compound fertilizer containing 20% of N and 10% of $K_2O$ was used, and that the temperature of the granules was maintained at 105° C. with using hot air. The test of Example 1 was repeated, and the result is shown in Table 2.

COMPARATIVE EXAMPLE 1

A coating composition was prepared by mixing constituents which are shown in Table 1. The process of Example 1 was repeated with using this coating composition. During the spraying, blocking of the coating film occurred. This interfered with fluidization of the granules, and many of the coating films exfoliated from the granules. Therefore, the test of Example 1 was not conducted.

With reference to Table 2, it is understood that nitrogen was gradually released from the fertilizer granules. In the preparation of the coating film according to the present invention, organic solvent is not used. Therefore, it is not necessary to take extra cares against organic solvent.

TABLE 1

| Constituents | Coating composition (wt %) | | | | |
| --- | --- | --- | --- | --- | --- |
| | Ex. 1 | Ex. 2 | Ex. 3 | Ex. 4 | Com. Ex. 1 |
| 60% soybean oil-modified alkyd resin | 30 | 45 | 30 | 30 | 30 |
| Tung oil | 49 | 38 | 32 | 25 | — |
| Conjugated linoleic acid pentaerythritol ester | 15 | 11 | — | 15 | — |
| Dehydrated castor oil | — | — | — | 24 | — |
| Boiled oil formed by linseed oil | — | — | 32 | — | 64 |
| Zirconium octylate | 2.2 | 2.2 | 2.2 | 2.2 | 2.2 |
| Cobalt octylate | 1.2 | 1.2 | 1.2 | 1.2 | 1.2 |
| Manganese naphthenate | 0.6 | 0.6 | 0.6 | 0.6 | 0.6 |
| Antiskinning agent | 2.0 | 2.0 | 2.0 | 2.0 | 2.0 |

TABLE 2

| | Fertilizer | Coating amount (wt %) | Nitrogen release rate (%) (in 25° C. water) | | | | |
| --- | --- | --- | --- | --- | --- | --- | --- |
| | | | 3 days | 10 days | 30 days | 50 days | 70 days |
| Ex. 1 | urea | 18.2 | 0.7 | 7.0 | 45.6 | 64.8 | 75.1 |
| Ex. 2 | urea | 17.6 | 0.7 | 7.5 | 45.0 | 66.0 | 78.1 |
| Ex. 3 | urea | 11.6 | 2.6 | 14.2 | 53.6 | 74.7 | 86.1 |
| Ex. 4 | urea | 18.7 | 0.7 | 5.2 | 46.5 | 67.4 | 77.0 |
| Ex. 5 | NK | 10.0 | 5.3 | 17.5 | 47.7 | 71.8 | 85.6 |

What is claimed is:

1. A solvent free coating composition for coating a granular fertilizer therewith, the coating composition consisting essentially of:
   an oil-modified alkyd resin;
   an unsaturated oil containing a conjugated double bond;
   a metal soap for crosslinking said unsaturated oil itself and/or for crosslinking between said unsaturated oil and said alkyd resin; and
   an antiskinning agent for preventing skinning of the coating composition, said antiskinning agent being optionally contained in the coating composition.

2. A coating composition according to claim 1, wherein said unsaturated oil contains an unsaturated fatty acid which has a conjugated double bond in the molecule.

3. A coating composition according to claim 1, wherein said oil-modified alkyd resin has a molecular weight ranging from 500 to 5000.

4. A coating composition according to claim 1, wherein said oil modified alkyd resin is mixed with said unsaturated oil in the ratio from 2:8 to 7:3.

5. A coating composition according to claim 1, wherein said metal soap is one of a metal naphthenate and a metal octylate.

6. A coating composition according to claim 1, wherein the amount of said metal soap is from 0.5 to 3 wt % of the total amount of said oil-modified alkyd resin and said unsaturated oil.

7. A coating composition according to claim 1, wherein said antiskinning agent is at least one agent selected from the group consisting of dipentene, methoxyphenol, cyclohexanone oxime and methyl ethyl ketoxime.

* * * * *